United States Patent [19]

Gellert

[11] 4,451,974
[45] Jun. 5, 1984

[54] PRESSURE CASTING PROCESS

[76] Inventor: Jobst U. Gellert, 7A Prince St., Glen Williams, Ontario, Canada

[21] Appl. No.: 369,192

[22] Filed: Apr. 16, 1982

[30] Foreign Application Priority Data

Mar. 31, 1982 [CA] Canada .................................. 400011

[51] Int. Cl.³ ............................................. H05B 3/06
[52] U.S. Cl. .................................... 29/611; 164/112; 164/120; 425/549
[58] Field of Search .................. 29/611; 164/105, 112, 164/120, 110, 69.1, 70.1; 425/549; 219/421, 424, 426, 523, 544, 546

[56] References Cited

U.S. PATENT DOCUMENTS

| 627,538 | 6/1899 | Shaw | 164/112 |
|---|---|---|---|
| 3,383,493 | 5/1968 | Gellert | 29/611 |
| 3,913,657 | 10/1975 | Banker et al. | 164/105 |
| 4,170,055 | 10/1979 | Zethraeus | 164/69.1 |
| 4,238,671 | 12/1980 | Gellert | 219/421 |
| 4,337,817 | 7/1982 | Komatsu et al. | 164/105 |
| 4,386,262 | 5/1983 | Gellert | 29/611 |

Primary Examiner—Howard N. Goldberg
Assistant Examiner—P. W. Echols
Attorney, Agent, or Firm—Riches, McKenzie & Herbert

[57] ABSTRACT

This invention relates to an improved method of manufacturing a heater nozzle for an injection molding system. The heater nozzle has a helical heating element which is cast into an outer portion around an inner liner through which the melt flows. The outer portion is formed of a conductive material such as a beryllium copper alloy and the inner liner is formed of a durable corrosion resistant material such as stainless steel to provide an excellent combination of these characteristics. The heater nozzle is made by positioning the heating element around a pre-heated solid threaded liner in a mold and pressure casting the beryllium copper outer portion around them. The elongated liner is very accurately located in the mold by having the lower end received in a seat in the mold and the upper end received in an aperture through the plunger as it closes. In another embodiment, the inner liner is provided with a Y-shaped joint by attaching an arm portion to it by brazing them in a vacuum furnace prior to the pressure casting step. After pressure casting, the liner is then drilled to form the melt passage through it and the heater nozzle is machined to remove the projecting ends of the liner and to finish the outside according to predetermined dimensions. This provides a very economical method of making heater nozzles with the necessary combination of characteristics to withstand the operating conditions of a large range of applications.

8 Claims, 4 Drawing Figures

PRESSURE CASTING PROCESS

BACKGROUND OF THE INVENTION

This invention relates to injection molding and more particularly to an improved method of manufacturing an integral heater nozzle for an injection molding system.

As has been long known, the provision of heat and the heat transfer characteristics of a heater nozzle is critical to its satisfactory operation. More recently, the rapidly increasing use of difficult to mold engineering materials such as flame retardant, glass filled polycarbonate and nylons has made the characteristics of corrosion and wear resistance of more and more importance. Thus heater nozzles are required which provide improved combinations of these characteristics, while remaining economically feasible to produce. The applicant's U.S. Pat. No. 3,383,493 which issued May 14, 1968 shows a heater block which is pressure cast of a beryllium copper alloy. While this has been very satisfactory for many applications, it increasingly is being found not to be sufficiently corrosion and wear resistant for the complete range of uses to which it is being applied. The applicant's U.S. Pat. No. 4,238,671 which issued Dec. 9, 1980 discloses a heated sprue bushing which overcomes this problem by providing an inner core portion through which the melt flows formed of a beryllium nickel alloy which is quite corrosion resistant. However, this structure has the disadvantages that it is relatively costly to manufacture and the beryllium nickel alloy is very difficult to machine. Other attempts to overcome the problem include nickel plating the melt passage through heater blocks of the type shown in the applicant's above-mentioned U.S. Pat. No. 3,383,493. However, it has been found that materials such as polycarbonate can have a gripping force when it shrinks sufficient to strip off this type of corrosion resistant plating and ruin the heater nozzle. Consequently, it is desirable to provide a heater nozzle which is sufficiently durable for modern materials, while retaining the necessary heat transfer characteristics.

SUMMARY OF THE INVENTION

Accordingly, it is an object of the invention to at least partially overcome these problems by providing an economical method of producing heater nozzles having an excellent combination of heat transfer and wear and corrosion resistant characteristics.

To this end, in one of its aspects, the invention provides a method of manufacturing an integral heater nozzle for an injection molding system, the heater nozzle having a melt passage extending through an inner liner therein and an electric heating element cast into an outer conductive portion, the method comprising essentially the steps of pre-heating an elongated liner to a predetermined temperature, mounting a coiled electric heating element in a pre-shaped mold, mounting the heated liner inside the heating element in the mold, introducing a molten conductive material into the mold around the liner to substantially cover the heating element, applying pressure to the molten material to remove entrapped gases and pressure cast the molten material around the liner and the heating element to closely bond it thereto, and drilling a melt passage substantially centrally through the liner.

Further objects and advantages will appear from the following description, taken together with the accompanying drawings.

BRIEF DESCRIPTION OF THE DRAWINGS

FIG. 4 is a sectional view showing the heater nozzle produced by the second embodiment.

DESCRIPTION OF THE PREFERRED EMBODIMENTS

Figure 1:
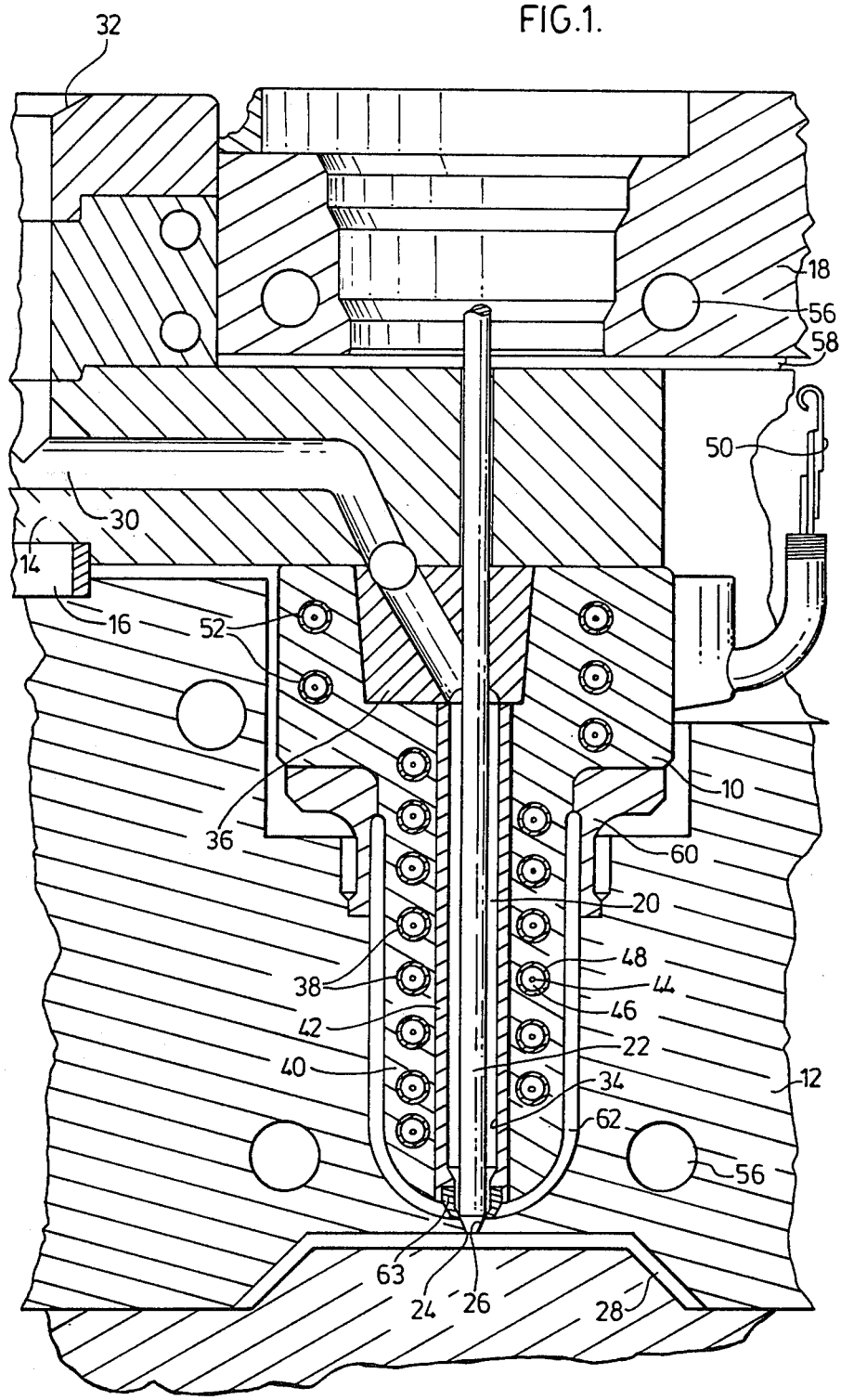
FIG. 1 is a sectional view of a portion of an injection molding system showing a heater nozzle made by one embodiment of the invention.

Reference is first made to FIG. 1 which shows a portion of a multi-cavity hydraulically actuated valve gated injection molding system with a heater nozzle 10 seated in a cavity plate 12. A manifold 14 positioned by locating ring 16 extends between the heater nozzle 10 and a back plate 18. The heater nozzle 10 has a central bore 20 through which extends a valve pin 22 which has a tip end 24. Hydraulically driven actuating mechanism which is not shown seats in the back plate and engages the valve pin 22 to reciprocate it in the bore 20 between an open position and the closed position shown in which the tip end 24 is seated in a gate 26 in the cavity plate 12 leading to the cavity 28. A melt passage 30 branches out from a recessed inlet 32 through the manifold 14 and extends through the heater nozzle 10 to the gate 26. As may be seen the melt passage 30 through the heater nozzle is provided around the valve pin 22 by an enlarged portion 34 of the bore 20. In this embodiment, the heater nozzle 10 shown in FIG. 1, the melt passage 30 joins the bore 20 at a Y-shaped joint in a bushing seal 36 which is seated in the heater nozzle 10. The bushing seal 36 is as described in the applicant's U.S. Pat. No. 4,026,518 which issued May 31, 1977 and is formed of stainless steel.

The heater nozzle 10 has an electric heating element 38 which is cast into an outer conductive portion 40 around a hollow inner liner 42 which forms the enlarged portion 34 of the central bore 20. The heating element 38 is of the type with a resistance wire 44 extending through a heat transfer material 46 such as magnesium oxide powder in a metal outer casing 48. It has a number of coils in a helical shape and receives power through terminals 50 to provide the heat necessary to maintain the melt at the necessary temperature. A few of the coils 52 leading to one of the terminals 50 are larger in diameter than the rest to extend around the bushing seal 36. The outer conductive portion 40 is formed of a beryllium copper alloy, while the inner liner 42 is formed of stainless steel. As described in above-mentioned U.S. Pat. No. 4,238,671, the beryllium copper alloy quickly conducts heat away from the heating element 38 and applies it uniformly to the outer surface 54 of the inner liner 42. The stainless steel inner liner has sufficient structural strength, is resistant to the corrosive effects of the melt flowing through it, and is very durable to provide an extended effective life under very difficult conditions. The outer surface 54 of the inner liner 42 is threaded which provides increased surface contact between the beryllium copper and the stainless steel to increase effective heat transfer as well as being useful during the pressure casting step as described below.

Conventional cooling elements 56 are provided through the cavity plate 12 and back plate 18 to retain them at desired temperatures. In order to reduce heat loss from the hot manifold to the back plate 18, an air space 58 is provided between them. Similarly, the heater nozzle 10 is mounted on an insulation bushing 60 in the cavity plate 12 to provide another insulative air space 62 between it and the cool cavity plate 12. This air space 62 is bridged around the gate 26 by a hollow cylindrical seal 63 which is formed of a titanium alloy and seats in the heater nozzle 10 as described in the applicant's U.S. Pat. No. 4,043,740 which issued Aug. 23, 1977. The heater nozzle 10, manifold 14, back plate 18 and actuating mechanism are secured in place by bolts (not shown) extending through them.

Figure 2:
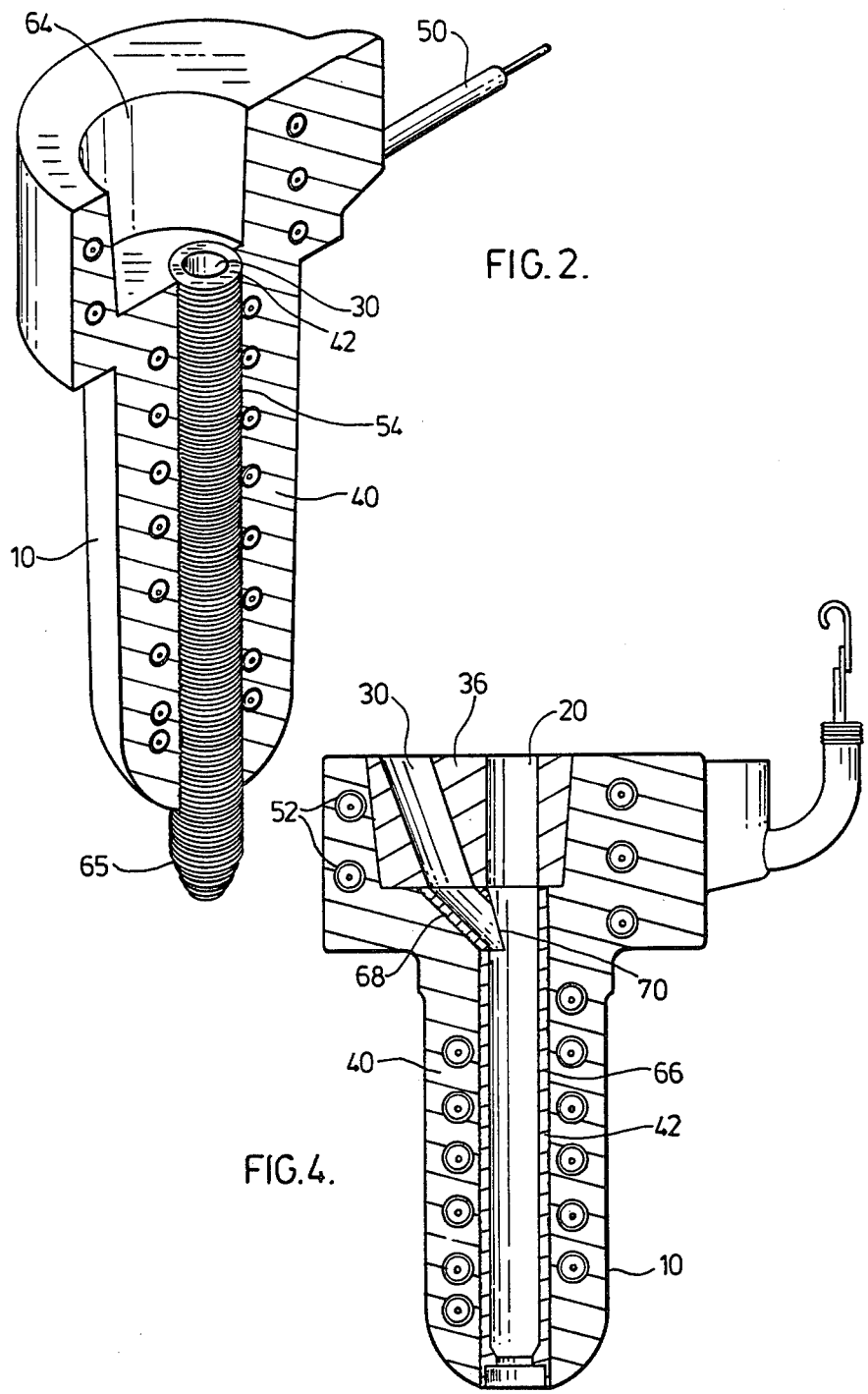
FIG. 2, located on page with FIG. 4, is a cutaway view of the heater nozzle shown in FIG. 1.

FIG. 2 shows the heater nozzle 10 shown in FIG. 1 and clearly illustrates that the outer surface 54 of the liner 42 is threaded and that it has been drilled to form the melt passage 30 through it. It shows the well 64 which has been machined in the heater nozzle 10 to receive the bushing seal 36 and a projecting end 65 of the inner liner 42 which has not yet been machined off as described below with reference to FIGS. 3 and 4. It also shows one of the terminals 50 of the heating element 38 which have not yet been bent to the position shown in FIG. 1.

In use, following assembly of the system shown in FIG. 1, electrical power is applied to the terminals 50 of the heating element 38 to heat the heater nozzle 10 up to operating temperature. Pressurized melt from the molding machine is then introduced into the melt passage 30 and the valve pin actuating mechanism operated according to a predetermined cycle in a conventional manner. After sufficient melt has been injected to fill the cavity 28 and the high injection pressure held for a short period to pack, the valve pin 22 is then reciprocated to the closed position with the tip end 24 seated in the gate 26. The melt pressure is then reduced and the position held for a cooling period before the mold is opened for ejection. After the mold is closed again, the valve pin 22 is reciprocated to the open position and the high injection pressure is reapplied. It is, of course, important that the system is sufficiently reliable that this cycle may be continuously repeated without failure over a long operating life.

Figure 3:
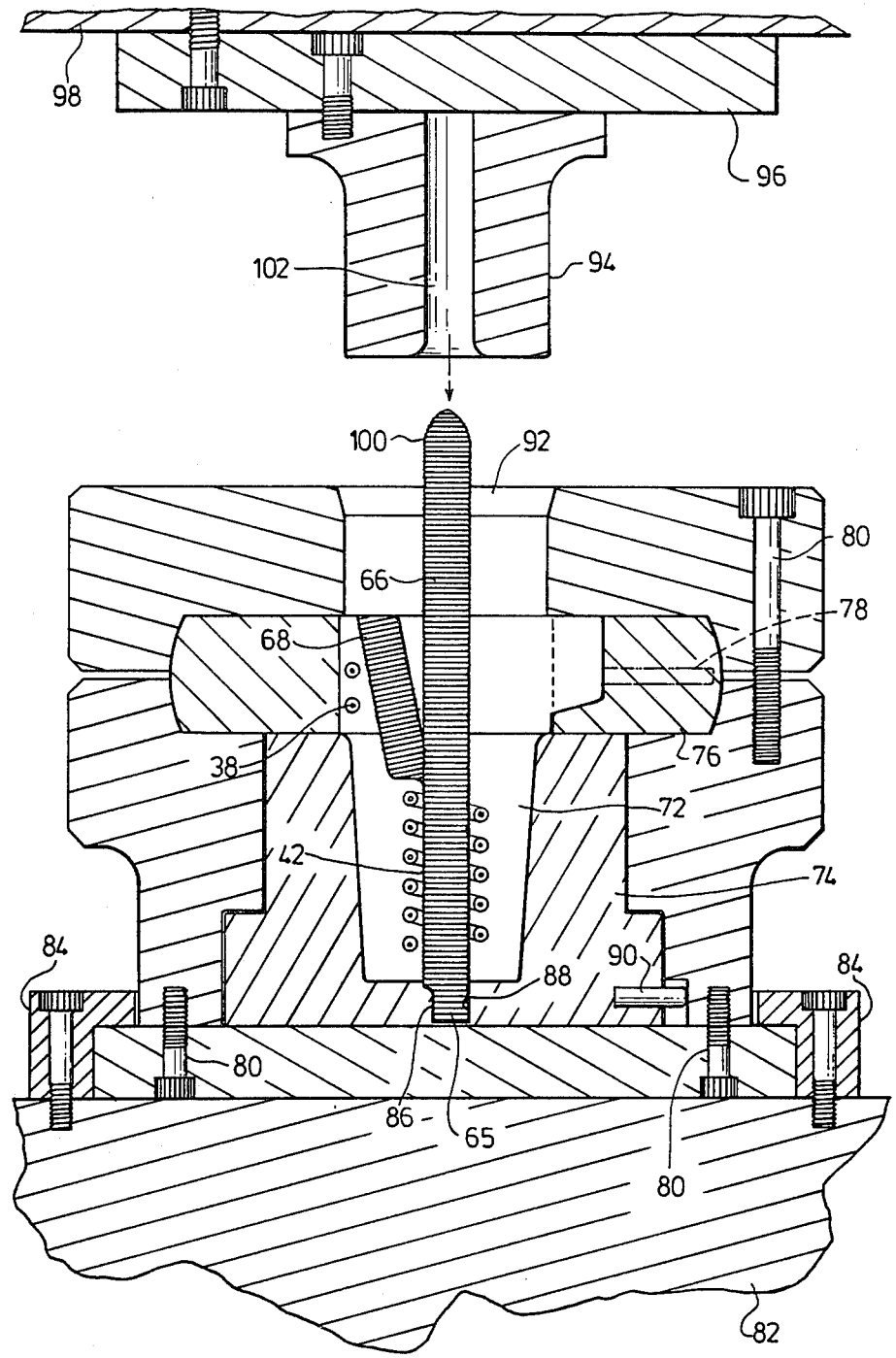
FIG. 3 is a diagrammatic section view showing a heater nozzle being cast in a mold according to a second embodiment of the invention.

The method of manufacturing the heater nozzle 10 shown in FIGS. 1 and 2 is so similar to the method illustrated in FIG. 3 of manufacturing the heater nozzle shown in FIG. 4 that the description need not be repeated. Most of the features of the heater cast 10 shown in FIG. 4 are the same as those described above and therefore, features common to both are described and illustrated using the same reference numerals. The difference is that in the heater nozzle 10 shown in FIG. 4, the Y-shaped joint between the melt passage 30 and the central bore 20 through the heater nozzle 10 is provided in the heater nozzle 10 itself rather than in the bushing seal 36. Thus, the inner liner 42 has a main central portion 66 and an arm portion 68 which joins it at an angle. The bushing 36 has two holes through it, one in alignment with the central bore 20 provided by the central portion 66 and the other in alignment with the arm portion 68.

The method of manufacture will now be described with particular reference to FIG. 3. Firstly, the main central portion 66 and the arm portion 68 of the inner liner 42 are formed of threaded solid stainless steel stock and machined so that the end of the arm portion 68 fits closely in a notch in the side of the central portion 66. They are then assembled in position, a nickel brazing paste is applied along the joint 70 between them, and they are heated in a vacuum furnace (not shown). This makes the brazing paste run all along the joint 70, brazing them together. While other methods of joining them together could be used, this is an effective mean of providing a very good bond between them. The helical heating element 38 is then centrally positioned in a cavity 72 in a pressure cast mold 74. The upper portion 76 of the mold 74 is formed in a split ring with one of them having holes 78 to receive the cold terminals 50 of the heating element 38 to hold it in position. The Y-shaped liner 42 is then heated in a furnace to a temperature sufficient for the conductive material to bond to it during casting. In the present case where a beryllium copper alloy is being cast on the stainless steel liner 42, the liner is pre-heated to a temperature of about 1600° F. The liner is then mounted inside the helical heating element 38 in the mold 74 which is securely asembled by bolts 80 and secured to a lower machine platen 82 by clamps 84. As may be seen, the central portion 66 of the inner liner 42 has one end 65 with a flat side 86 which is received in a matching seat 88 and the mold 74 is secured against rotation by pin 90 to provide the correct angular orientation between the liner 42 and the cold terminals 50 of the heating element 38. Molten beryllium copper alloy is then ladled into the cavity 72 through the mouth 92 until it is filled to a predetermined level. The plunger 94 which is bolted to a bolster plate 96 which, in turn, is bolted to the upper machine platen 98 is then lowered to apply the casting pressure to the beryllium copper alloy. The casting pressure applied by the plunger 94 must be sufficient to drive out the entrapped air to closely bond the beryllium copper alloy to the threaded surface 54 of the stainless steel liner 42 and prevent the formation of any insulative air pockets between them. Depending upon the exact materials and configuration, this may be in the area of 50,000 psi. It is important that the pre-heated inner liner 42 is accurately located in the outer beryllium copper portion 40 and this is provided by having the lower end 65 located by seat 88, while the upper end 100 is located by the plunger 94. The plunger 94 has a central hole 102 through it with a beveled mouth and, as the plunger 94 descends, it receives the projecting upper end 100 of the inner liner 42 to accurately locate it in the mold. As the plunger 94 descends, the air in the cavity 72 escapes through the hole 102 around the upper end 100 of the liner 42. As the plunger starts to apply the casting pressure, the escape of air is promoted by the outer surface 54 of the liner 42 being threaded. After the air has all been expelled, the beryllium copper alloy solidifies in the threads and provides a seal so that the plunger 94 can apply the necessary casting pressure. The casting pressure is held until the beryllium copper alloy has solidified and the cast heater nozzle 10 is then removed from the mold. As mentioned above, the hater nozzle is machined to remove the ends 65 and 100 of the inner liner and to form the well 64 to receive the bushing seal 36. The liner 42 is then drilled or machined to form the melt passage 30 and the bore 20 which join at the Y-shaped joint. The outer surface of the beryllium copper alloy is also machined to provide a clean finish of predetermined dimensions and the cold terminals 50 bent to the desired positions.

The method of manufacturing the heater nozzle 10 shown in FIGS. 1 and 2 is essentially the same except that there is no arm portion 68 of the liner 42 and therefore the step of joining them is not required. The steps of pre-heating the liner, pressure casting, and drilling the melt passage are otherwise essentially the same.

Although the description of this invention has been given with regard to particular embodiments of the method of manufacture, it is not to be construed in a limiting sense. Many variations and modifications will now occur to those skilled in the art. For instance, it is apparent that other materials which have suitable properties may be used. Other pressure casting apparatus could be used, and the heater nozzle could have other configurations. For a definition of the invention, reference is made to the attached claims.

What I claim is:

1. A method of manufacturing an integral heater nozzle for an injection molding system, the heater nozzle having a melt passage extending through a corrosion resistant inner liner therein and an electric heating element cast into an outer conductive portion, the method comprising essentially the steps of:
   (a) pre-heating an elongated liner having first and second ends to a predetermined temperature;
   (b) mounting a coiled electric heating element in a pre-shaped mold;
   (c) mounting the heated liner inside the heating element in the mold with the first end of the liner received in a seat in the mold to accurately locate said first end;
   (d) introducing a molten conductive material into the mold around the liner to substantially cover the heating element;
   (e) applying pressure to the molten material by a plunger having an opening therein which receives the second end of the liner to accurately locate the liner as the pressure is applied to remove entrapped gases and pressure cast the molten material around the liner and the heating element to closely bond it thereto;
   (f) drilling a melt passage substantially centrally through the liner; and
   (g) machining off protruding portions of the first and second ends of the liner following casting.

2. A method as claimed in claim 1 wherein the heater nozzle is machined adjacent one end of the liner to form a well which receives a bushing seal therein to provide a Y-shaped joint between the melt passage and a valve pin bore which extends through the heater nozzle.

3. A method as claimed in claim 1 wherein the liner is formed of two portions machined to join at a Y-shaped joint, further comprising the initial step of fixedly joining the two portions together.

4. A method as claimed in claim 3 wherein the two portions are joined by mounting them together in position, applying brazing material around the joint between them, and brazing the assembly in a vacuum furnace to securely join them together.

5. A method as claimed in claims 1, 2 or 3 wherein the inner liner is threaded.

6. A method as claimed in claims 1, 2 or 3 wherein the electric heating element is helical with a plurality of coils encircling the inner liner.

7. A method as claimed in claims 1, 2 or 3 wherein the inner liner is formed of stainless steel.

8. A method as claimed in claims 1, 2 or 3 wherein the molten conductive material is a beryllium copper alloy.

* * * * *